United States Patent
Bicer et al.

(10) Patent No.: US 6,489,377 B1
(45) Date of Patent: Dec. 3, 2002

(54) METHOD FOR PRODUCING THERMOTROPIC CASTING RESIN SYSTEMS AND UTILIZATION THEREOF

(75) Inventors: Taner Bicer, Stuttgart (DE); Christoph Schwitalla, Schorndorf (DE); Holger Goedeke, Achstetten (DE)

(73) Assignee: Fraunhoger-Gesellschaft zur Foerderung der Angewandten Forschung E.V. (DE)

( * ) Notice: Subject to any disclaimer, the term of this patent is extended or adjusted under 35 U.S.C. 154(b) by 0 days.

(21) Appl. No.: 09/701,939

(22) PCT Filed: May 4, 1999

(86) PCT No.: PCT/EP99/03043

§ 371 (c)(1),
(2), (4) Date: Jan. 30, 2001

(87) PCT Pub. No.: WO99/64488

PCT Pub. Date: Dec. 16, 1999

(30) Foreign Application Priority Data

Jun. 10, 1998 (DE) .......................... 198 25 984

(51) Int. Cl.⁷ ............................ C08F 2/48; C08F 2/50
(52) U.S. Cl. ................. 522/153; 522/28; 522/113; 522/114; 522/119; 522/120; 522/121; 522/90; 522/96; 522/104; 522/107; 522/150; 430/20; 252/600; 428/1.1; 428/1.55; 428/1.54; 428/1.33
(58) Field of Search .................... 522/90, 96, 104, 522/107, 150, 153, 113, 28, 119, 114, 120, 121; 430/20; 428/1.1, 1.55, 1.54, 1.33; 252/600

(56) References Cited

U.S. PATENT DOCUMENTS

| 5,015,689 A | | 5/1991 | Meier et al. | |
|---|---|---|---|---|
| 5,587,404 A | * | 12/1996 | Kroner et al. | ............... 522/85 |
| 6,140,387 A | * | 10/2000 | Gerst | ........................ 522/79 |

FOREIGN PATENT DOCUMENTS

| DE | 44 33 090 A1 | 3/1996 |
|---|---|---|
| DE | 196 42 886 A1 | 4/1998 |
| EP | 0 544 052 A1 | 6/1993 |
| WO | WO 96/15179 A2 | 5/1996 |

* cited by examiner

Primary Examiner—James J. Seidleck
Assistant Examiner—Sanza L. McClendon
(74) Attorney, Agent, or Firm—Marshall & Melhorn, LLC

(57) ABSTRACT

The invention relates to a method for producing thermotropic casting resin systems that comprise at least one matrix polymer including at least one thermotropic monomer compound which cannot be mixed with the matrix polymer, whereby the matrix polymer an the thermotropic monomer compound are selected in such a way that their refraction indices are almost the same in a temperatrue range that is below the temperature required for structural change and that reaches the temperature of structural change of the thermotropic monomer compound, the casting resin system being translucent or transparent in this termperature range. After dissolving the monomer thermotropic compund in a matrix solution containing a photohardening oligomer, reactive diluents and photoinitiators and a liquid, photohardenable system is obtained, photoradiation with exclusion of oxygen is carried out for hardening.

13 Claims, 1 Drawing Sheet

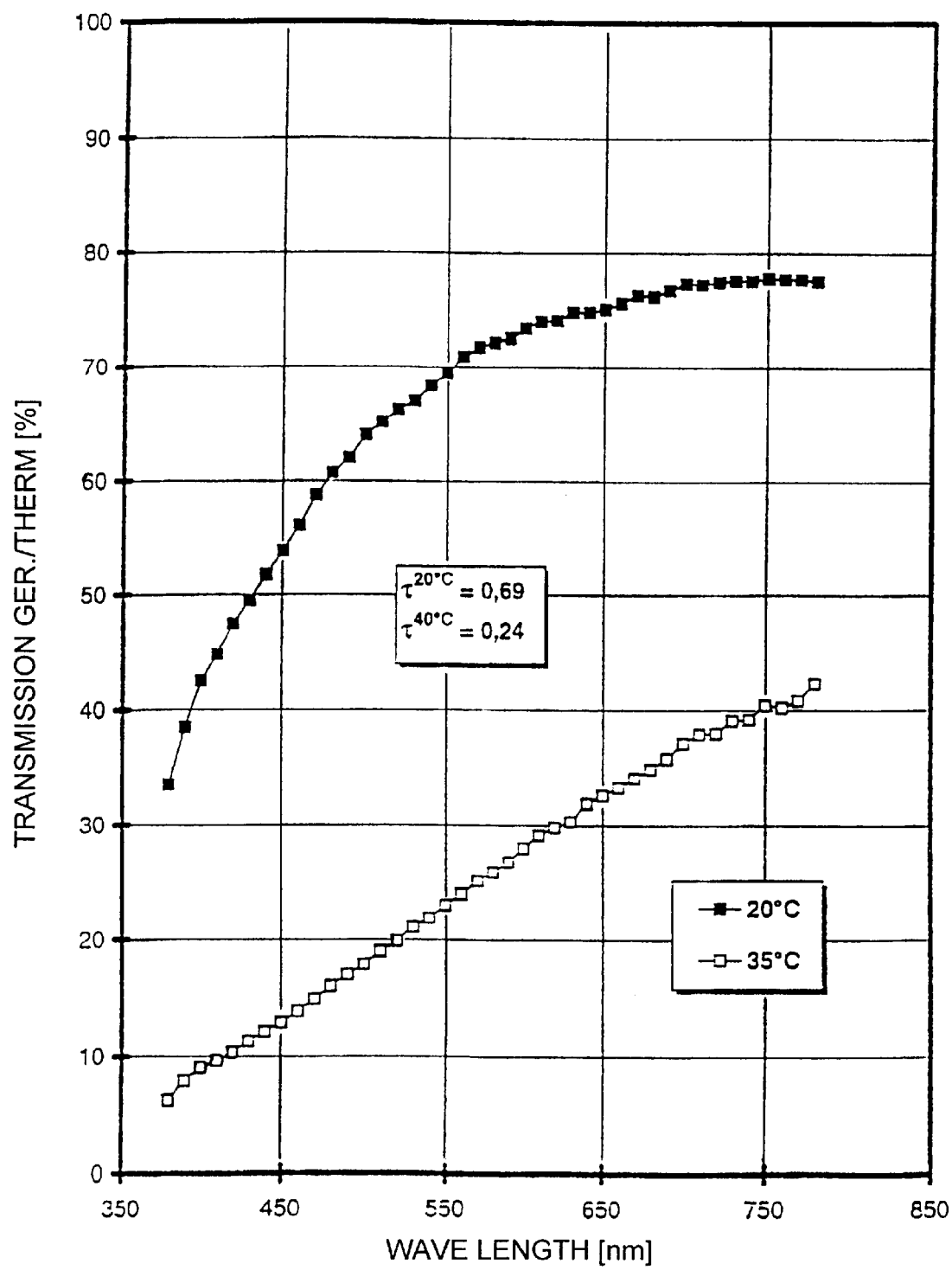

METHOD FOR PRODUCING THERMOTROPIC CASTING RESIN SYSTEMS AND UTILIZATION THEREOF

BACKGROUND OF THE INVENTION

1. Field of the Invention

The present invention relates to a method for producing thermotropic resin systems that comprise at least one matrix polymer including at least one (thermotropic) monomer compound which cannot be mixed with the matrix polymer, and the structure of which cannot be affected by temperature changes, whereby the matrix polymer and the thermotropic monomer compound are selected in such a way that their refraction indices are almost the same in a temperature range that is below the temperature required for structural change and that reaches the temperature of structural change of the thermotropic monomer compound, the casting resin system being therefore translucent or transparent in this temperature range, as well as the utilization of such thermotropic cast resin systems.

There are already several known thermotropic systems, especially in connection with the shading of glass surfaces.

2. Description of the Related Art

From the generic DE 44 33 090 A1 a thermo-optical polymer material is known, which consists of at least one matrix polymer compound and one monomer compound, whereby the matrix polymer and the monomer compound are chosen in such a way that their refraction indices in the temperature range below the temperature required for structural change up to the temperature for structural change of the monomer compound are almost equal, and the polymer material is thus translucent and transparent in this temperature range. In this case, the polyesters are suggested as the matrix polymers, and as the monomer compounds, alkanes with C10 to C25 are preferably proposed.

From the German patent application DE 196 42 886.6 it is known that on the basis of completely dissociated polymers, thermotropic systems can be formulated which are utilized for the production of thermotropic coatings. In this case, at first a coating solution is produced (for example with xylol as a solvent). The application of the coating solution is carried out with known paint-technological coating processes, such as, for example, blade-coating, spraying or flow-coating. After the coating solution is applied the solvent is vaporized and subsequently the cross linkage is thermally induced. After cooling and intermediate storage the application of the cover coat is preferably made. The disadvantage of this process consists in that during the vaporization of the solvent poisonous vapors can be generated. This can lead to environmental contamination as well as require higher investment costs for work safety. Furthermore, because of the costly drying process the manufacturing process it is only usable for exposed surfaces or for coatings with a limited film thickness, so that the possibility of applying it for large industries is limited.

A further development is based on a thermotropic gel which consists primarily of colloidal parts of a polyether-water mixture, which is enclosed in a gel-like layer of a vinyl-carboxyl-water mixture. In this case a tenside surface serves as the solubilizer. When a critical temperature is exceeded, on the one hand the water linked to the macromolecule will be split off to the outer solvent. At the same time a temperature-dependent felting of the macromolecules takes place. In addition to this partial growth the relative refractive index of the particles is increased by the water separation (See also European patent 86 904 133). These thermotropic gels can, for example, be filled into the intermediate space between window panes in order to produce thermo-optical glazing. The disadvantage of this development, however, consists in that the generally highly viscous systems can only be used for filling at a high expenditure, and that the edge seals must be made in such a way that they seal against water vapor diffusion as well being resistant to chemicals, in order to prevent them from drying out. In addition to high production costs the long term stability of such a glazing is generally strongly limited.

On the basis of the DE 44 33 090 A1 the present invention is based on the objective of creating a process for the production of thermotropic resin casting systems, which makes it possible to produce thermotropic casting resin systems of long-term durability and of any desired shape and size, and to do so rapidly, cost-effectively, and in a way which is safe for the environment.

This task is achieved by a production process according to claim 1, and as far as the utilization is concerned by the characteristics of claim 2.

SUMMARY OF THE INVENTION

Due to the fact that the thermotropic casting resin systems (T-OPAL) are kept for hardening by dissolving the monomer compound in a matrix solution, which contains photo-hardening oligomers, reactive thinners as well as photo initiators, into a photo hardenable system and subsequent photo radiation under the exclusion of oxygen, a solvent to be evaporated can be completely dispensed with. Thus no (often toxic) solvent emissions are generated, and therefore the contamination of the work place is small without the costly use of additional safety measures. By means of the elimination of the drying process, which in the case of solvent-containing coating solution is very time-consuming or only makes coating of low thickness possible, the processing times can be greatly reduced. By a corresponding of the parameters (for example an increased addition of photo initiators) very short hardening times can be achieved. The process further distinguishes itself by the very simple processing methods as well as a low apparatus cost, and, furthermore, the hardened casting resin system has, in particular in contrast to thermotropic gels according to the state of the art, a clearly improved long-term stability.

During the hardening process, which takes place under the effect of photo radiation, in the present production process the reactive thinner becomes part of the hardening reaction (depending on the intensity of the radiation, the addition of corresponding photo initiators as well as the fill form of the casting resin system a duration of photo radiation of from 1 to 20 minutes is required). In this case the thermotropic compound or component turns out to be very finely distributed and is, therefore, added to the matrix in the crystalline state, as it generates itself. In order to make the desired precipitation possible, the matrix solution must display a corresponding solubility for the thermotropic component. In order to make possible the desired precipitation, the matrix solution must have a corresponding solubility for the thermotropic component. The solvent power of the matrix in combination with the cross-linking speed determines the grain size distribution as well as the number of separation zones, which in turn have a significant effect upon the radiation technological properties of the layers. Thus the temperature dependent as reduction of the degree of radiation transmission as well as the dependence of the wave length of the transmission can be varied purposefully by means of these parameters.

In any case, however, one has to see to it that the optical density of the matrix being generated is adjusted to the thermotropic component, i.e. that the index of refraction of the matrix corresponds to that of the thermotropic component below the temperature determining the structural change of the thermotropic component (for example, the index of refraction of the matrix is preferably $1.5<n_D^{20}<1.58$) when paraffins are used. In this context it is advantageous or required that the index of refraction of the matrix is across a wide temperature range (for example between 10 and 40 EC).

Because in order to harden the matrix solution no thermal treatment is necessary, the entire production process, which means the solution of the thermotropic monomer compound in the matrix solution as well as the subsequent photoradiation, can take place at room temperature. Because of reasons of processing technology an ambient temperature range of from 10 to 30 EC must be maintained, preferably 20 EC.

In this way, the photoradiation can be undertaken with light of various wave lengths, however, it is especially advantageous to carry out the irradiation with UV light in the wave lengths from 200 to 500 nm.

The matrix solution can have been put together in many different ways. For the photo hardening resins acrylic-modified, saturated, aliphatic systems, such as, for example, polyesters, urethanes or polyethers are to be used, where it is advantageous to apply 20 to 80 parts in the formulation. As reactive thinners, for example, acrylic acid, ethyl acrylate, s-buthylacrylate, 2-hydroxyethyl-acrylate, ethoxy-ethoxy-ethyl acrylate, tetrahydrofurfurylacrylate or methyl-methacrylate are used. Preferably 80 to 20 parts of reactive thinner are added to the formulation. Furthermore, commercially available photo initiators, such as, for example, phosphine oxides and ketones, are to be used. It is advantageous to select an initiator content of from 0.5 to 1 part.

As thermotropic components, for the production process according to the invention commercially available thermotropic compounds should be considered. These are preferably aliphatic compounds, especially alkanes of the general formula $C_n H_{2n+2}$ with n=10 to n=25. Depending on the selection of the thermotropic monomer compounds, the temperature determining the structural change and thus the changed optical properties are in the range of from 10 to 50 EC, preferably in the range from 20 to 40 EC.

The filling process of the mixed, liquid casting resin system, which already contains the thermotropic component, can take place in different ways. In addition to feeding it into any type of transparent body to be filled, it is possible, for example, to feed the liquid system prior to the photo radiation process into an intervening space located between two transparent glass or plastic panes, which is sealed all around the edge. In this way the discharge of the oxygen during the hardening of the casting resin system is ensured in an especially simple manner. In the use of organic grouser plates, the hollow chambers of which are filled, a separate sealing of the edges can be dispensed with. In each case one can resort to techniques, which are already established in the glazing industry, because, for example, the filling of the spaces between panes for the purpose of sound insulation is already part of the state of the art.

After the hardening process induced by photo radiation, the panes surrounding the filled space can remain in place or be removed. In the case where the surrounding panes remain in place, the adhesion between the fill material and the panes can preferably be further improved commercially available adhesive agents, perhaps silanes, and this increases at the same time the strength of the overall arrangement. This can take place, for example, by the deposition of suitable adhesive agents upon the appropriate interior surfaces of the surrounding panes. Because the surrounding panes remain in place this has the advantage that the thermotropic layer is protected against a mechanical, chemical or radiation-related attack, and furthermore a continuously high surface quality is ensured.

However, it is of course also possible to use the hardened casting resin system as an independent pane after removal of the surrounding panes.

A further possibility consists in that the liquid system is applied openly to a substrate prior the photo radiation. This can take place by means of a process typical in the paint industry, such as spraying, flow coating or blade coating. In each case it is, however, important to see to it that the photo radiation takes place in a room where the oxygen has been cut off or that outside such a room a gastight foil is placed directly upon the applied layer during the photo radiation.

Regardless of whether the liquid system is poured into a closed form or upon an open surface during the photo radiation, film thicknesses can be obtained within a very wide range of magnitudes. Thus it is possible without any difficulty to obtain film thicknesses in the range of from 0.1 mm to 10 mm. Corresponding fillings or coatings can be applied in all the areas of technology, especially in the case of structures and vehicles which are exposed to the sun. By means of the coating or filling process according to the invention of transparent structural components, for example, of glass or plastic, a sight protection or shading can thus be generated, which becomes less transparent to light at high temperatures and thus makes the use of energy-intensive air-conditioning units unnecessary or makes it possible to use smaller units. Because of the lower raw material costs, the cost of the fillings or coatings according to the invention are thus relatively small.

The invention will be explained below in more detail on the basis of two performance examples:

EXAMPLE 1

To 80.9 parts of an acrylic-modified saturated polyester (Viaktin, resins of the Vianova Company) are added 16.2 parts of methacrylic acid methyl ester (Merck Company) and in this mixture 1.9 parts of n-octadecan (Merck Company) are dissolved. To the solution obtained in this manner 1.0 parts of UV-initiator IRGACURE (Ciba-Spezialitätenchemie Company) is added. The edge of two float glass panes is closed off with the exception of a small fill opening with the help of a double-sided adhesive tape, which serves at the same time as a spacer. Into the space between the panes generated, the above-described low viscosity liquid is poured. Subsequently this composite pane is illuminated with UV-radiation (Vitalux, Osram Company) at a temperature of about 20 EC for 5 minutes.

EXAMPLE 2

80.9 parts of an acrylic-modified saturated polyester (Viaktin, resins of the Vianova Company) are added to 16.2 parts of divinyl benzol (Merck Company) and in this mixture 1.9 parts of n-eicosane (Merck Company) are dissolved. To the solution obtained in this manner 1.0 parts of UV-initiator IRGACURE (Ciba-Spezialitätenchemie Company) is added. The edge of two float-glass panes is closed off with the exception of a small fill opening with the help of a double-sided adhesive tape, which serves at the same time as a spacer. Into the space between the panes generated, the above-described low viscosity liquid is poured. Subsequently this composite pane is illuminated with UV-radiation (Vitalux, Osram Company) at a temperature of about 30 EC for 5 minutes.

EXAMPLE 3

To 48.8 parts of an aliphatic urathaneacrylate (Rahn Chemie) are added 4.8 parts of acrylic acid (Fluka), 24.2 parts of acrylic acid methyl ester (Fluka) and 19.4 parts of acrylic-acid-tetrahydrofurfuryl-acrylate (Cray Valley) and in this mixture 2.4 parts of n-octadecane (Fluka) are dissolved. To the solution obtained in this manner 0.8 parts of UV-initiator IRGACURE (Ciba-Spezialitätenchemie Company) are added. The edge of two float-glass panes is closed off with the exception of a small fill opening with the help of a double-sided adhesive tape, which serves at the same time as a spacer. Into the space between the panes generated, the above-described low viscosity liquid is poured. Subsequently this composite pane is illuminated with UV-radiation (UVA Black, Radium) at a temperature of about 25 EC for 10 minutes.

EXAMPLE 4

To 19.5 parts of a polyethylene-glycol-diacrylate (Fluka) are added 14.6 parts of acrylic acid (Fluka), 14.6 parts of dianoldiacrylate (Akcros) and 48.8 parts of acrylic-acid-tetrahydrofurfuryl-acrylate (Cray Valley) and in this mixture 2 parts of n-octadecane (Fluka) are dissolved. To the solution obtained in this manner 0.5 parts of UV-initiator IRGACURE (Ciba-Spezialitätenchemie Company) are added. The edge of two float-glass panes is closed off with the exception of a small fill opening with the help of a double-sided adhesive tape, which serves at the same time as a spacer. Into the space between the panes generated, the above-described low viscosity liquid is poured. Subsequently this composite pane is illuminated with UV-radiation (UVA Black, Radium) at a temperature of about 25 EC for 10 minutes.

BRIEF DESCRIPTION OF THE DRAWINGS

The transmission properties of a casting resin pane according to the invention are explained below on the basis of a FIGURE. It shows the following:

FIGURE Transmission measurements at a thermotropic casting resin pane according to Example 2.

DESCRIPTION OF THE PREFERRED EMBODIMENTS

The figure shows the directed hemispherical transmission of light of different wave lengths through a 2 mm thick thermotropic casting resin pane. The upper curve (filled squares) shows the transmission at 20 EC, the lower curve (empty squares) the transmission at 35 EC. It can be seen clearly that in this temperature range, which is significant for technical applications, a considerable reduction of the transmission for all wave lengths occurs with increasing temperatures. In addition, the transmission δ, which shows the radiation flow of the exiting light ray with respect to the radiation flow of the incident light ray, is indicated. This amounts to 0.69 at 20EC, but it is only 0.24 at 40EC.

What is claimed is:

1. Method for producing thermotropic casting resin systems that comprise at least one matrix polymer including at least one thermotropic monomer compound from the group of the alkanes of the general formula $C_nH_{2n+2}$ with n=10 to n=25, which monomer is immiscible with the matrix polymer, and the structure of which monomer cannot be affected by temperature changes, whereby the matrix polymer and the thermotropic compound are selected in such a way that their refraction indices are approximately equal in a temperature range that is below the temperature required for structural change of the monomer and up to the temperature of structural change of the thermotropic compound, and that the casting resin system is, therefore, translucent or transparent in this temperature range, characterized by:

a) dissolving the thermotropic compound in the matrix solution, the matrix solution containing photohardening oligomers, reactive thinners as well as photoinitiators into a liquid, photohardening system, b) photoradiation of the liquid system under the exclusion of oxygen for hardening purposes.

2. Method according to claim 1, characterized in that the photoradiation occurs with UV-light of the wave length of 200 to 500 nm.

3. Method according to claim 1, characterized in that the duration of the photoradiation for hardening the casting resin systems is between 1 to 20 minutes.

4. Method according to claim 1, characterized in that the photo-hardening resins are acrylic modified resins.

5. Method according to claim 1, characterized in that the reactive thinners are chosen from thinners which contain at least one unsaturated group.

6. Method according to claim 1, characterized in that the photoinitiators are ketones or phosphine oxides.

7. Method according to claim 1, characterized in that the thermotropic monomer compound is an aliphatic compound.

8. Method according to claim 1, characterized in that the temperature, which determines the structural change of the thermotropic compound is from 10 to SOEC.

9. Method according to claim 1, characterized in that the temperature which determines the structural change of the thermotropic compound is from 20 to 40EC.

10. Method according to claim 1, characterized in that the liquid system prior to processing step b) is poured into an intervening space between two transparent panes which is sealed around its edges, or into another transparent body to be filled.

11. Method according to claim 1, characterized in that the liquid system according to processing step a) is applied to a substrate.

12. Method according to claim 4, characterized in that the acrylic modified resins are selected from the group consisting of: polyesters and urethanes.

13. Method according to claim 5, characterized in that the reactive thinners are selected from the group of consisting of: acrylic acid, methacrylic acid-ester and divinyl benzol.

* * * * *